United States Patent [19]

Miller et al.

[11] Patent Number: 5,210,136
[45] Date of Patent: May 11, 1993

[54] ELASTOMERIC COMPOSITION

[75] Inventors: Richard A. Miller; Herbert T. Zollman, both of Kingsport, Tenn.

[73] Assignee: Eastman Kodak Company, Rochester, N.Y.

[21] Appl. No.: 615,734

[22] Filed: Nov. 16, 1990

[51] Int. Cl.$^5$ ............................................. C08G 63/91
[52] U.S. Cl. ........................................ 525/74; 525/78; 525/193; 525/194
[58] Field of Search ................... 525/74, 78, 193, 194

[56] References Cited

U.S. PATENT DOCUMENTS

| | | | |
|---|---|---|---|
| 3,635,754 | 1/1972 | Beede | 117/122 A |
| 3,850,858 | 11/1974 | Park | 260/27 BB |
| 3,868,433 | 2/1975 | Bartz et al. | 525/78 |
| 4,072,812 | 2/1978 | McConnell | 526/348 |
| 4,112,208 | 9/1978 | McConnell | 526/57 |
| 4,133,796 | 1/1979 | Bullman | 260/37 EP |
| 4,143,858 | 3/1979 | Schmidt, III et al. | 526/48.2 |
| 4,159,287 | 6/1979 | Ames | 260/878 R |
| 4,169,116 | 9/1979 | Trotter et al. | 525/210 |
| 4,217,428 | 8/1980 | McConnell | 525/191 |
| 4,221,696 | 9/1980 | Cooke et al. | 260/42.46 |
| 4,554,304 | 11/1985 | Hansen et al. | 524/291 |
| 4,567,223 | 1/1986 | Ames | 524/489 |
| 4,719,260 | 1/1988 | Stuart, Jr. et al. | 525/74 |
| 4,758,629 | 7/1988 | Deyrup et al. | 525/194 |
| 4,761,450 | 8/1988 | Lakshmanan et al. | 524/488 |
| 4,857,594 | 8/1989 | Lakshmanan et al. | 525/98 |
| 4,900,770 | 2/1990 | Tomita et al. | 524/274 |
| 4,957,968 | 9/1990 | Adur et al. | 525/74 |
| 4,983,435 | 1/1991 | Ueki et al. | 525/74 |

FOREIGN PATENT DOCUMENTS

| | | |
|---|---|---|
| 0285430 | 10/1988 | European Pat. Off. |
| 0367165 | 5/1990 | European Pat. Off. |
| 0391697 | 10/1990 | European Pat. Off. |
| 142520 | 9/1981 | Japan |

OTHER PUBLICATIONS

Defensive Publication T917008 (Fajans, Dec. 4, 1973).

Primary Examiner—Melvyn I. Marquis
Assistant Examiner—D. E. Aylward
Attorney, Agent, or Firm—Mark A. Montgomery; William P. Heath, Jr.

[57] ABSTRACT

An elastomer composition is prepared containing a maleated amorphous polypropylene and an elastomer selected from butyl elastomers, crosslinked butyl elastomers, and styrene ethylene butydiene styrene block copolymers.

5 Claims, No Drawings

ELASTOMERIC COMPOSITION

This invention relates to elastomeric compositions used in hot-melt formulations that contain an elastomer and an amorphous propylene polymer. The present invention more particularly relates to an elastomeric composition containing maleated amorphous polypropylene.

BACKGROUND OF THE INVENTION

Elastomeric compositions are well known and have been used in the industry for various applications such as adhesives, caulks, and sealants. These compositions typically contain an elastomer, a resin, and optionally a filler. The most costly component of these compositions is the elastomer. Therefore, compositions containing reduced amounts of elastomer to produce lower cost formulations would be very desirable and have been attempted in the industry. These lower cost formulations containing lower amounts of elastomer typically have increased filler loading or additional polymers such as low molecular weight polybutenes. However, these lower cost formulations typically have lower performance illustrated by low peel adhesion, tensile strength and/or poor weathering performance.

It would, therefore, be very desirable to produce low cost elastomeric formulations containing reduced amounts of elastomer while retaining the performance of formulations containing the high amounts of elastomer.

SUMMARY OF THE INVENTION

The present invention is directed to unique compositions containing an elastomer and a maleated amorphous polypropylene, preferably a maleated amorphous propylene copolymer selected from propylene/butene copolymers, and propylene/hexene copolymers. These compositions are useful in adhesive, caulk and sealant formulations and contain a reduced amount of elastomer while maintaining good performance. These compositions comprise:

(a) about 10 to 90 wt. %, based on (a) plus (b), of a maleated amorphous polypropylene containing at least 20 wt. % propylene;

(b) about 10 to 90 wt. %, based on (a) plus (b), of an elastomer selected from butyl elastomers, crosslinked butyl elastomers, styrene ethylene butadiene styrene block copolymers, and mixtures thereof; and optionally contains up to about 70 wt. % of a tackifier and up to about 80 wt. % of a filler.

The maleated amorphous polypropylene extends the elastomer, partially replacing the elastomer in the formulations while retaining and or improving performance properties such as enhanced peel adhesion and structural strength.

DETAILED DESCRIPTION OF THE INVENTION

The composition of the present invention comprises (a) about 10 to 90 wt. %, based on (a) plus (b), of a maleated amorphous polypropylene containing at least 20 wt. % propylene;

(b) about 10 to 90 wt. %, based on (a) plus (b), of an elastomer selected from butyl elastomers, crosslinked butyl elastomers, styrene ethylene butadiene styrene block copolymers, and mixtures thereof;

(c) about 0 to 70 wt. %, based on the total weight, of a tackifier, and;

(d) about 0 to 80 wt. %, based on the total weight, of a filler.

The applicants have unexpectedly discovered that the maleated amorphous polypropylenes can be used as an elastomeric extender in various compositions, while retaining good performance properties. The compositions of the present invention are particularly useful in caulk and sealant formulations typically containing an elastomer, a resin, and filler.

The maleated amorphous polypropylenes are known and are generally prepared as polymers by anionic coordination polymerization. They are made in solution or in the melt phase at 160°–200° C. The preparation of the amorphous polypropylenes, prior to maleation, are illustrated in the following U.S. Pat. Nos. 3,923,758, 4,826,939, 3,954,697, 4,072,813, and 4,259,470. The disclosures of which are incorporated herein in their entirety by reference.

These maleated amorphous polypropylenes are preferably propylene copolymers selected from copolymers of propylene/butene, propylene/hexene, and mixtures thereof, containing about 30 to 80 wt. % butene or hexene and about 70 to 20 wt. % propylene. These maleated amorphous propylene copolymers more preferably contain between about 40 and 70 wt. % butene or hexene; even more preferably between about 45 and 55 wt. % butene or 40 and 50 wt. % hexene. This aspect is disclosed and claimed more broadly in an application filed the same day as the present application.

The maleated amorphous propylene copolymers can also be a propylene/butene/hexene terpolymers or contain minor amounts of monomers other than the butene or hexene. This third monomer is preferably present in a concentration that is no more than about 20% by weight. Should the propylene copolymers contain a third monomer the amount of this third monomer is preferably between about 0.5 and 10% by weight. This third monomer is preferably ethylene.

The maleated amorphous polypropylenes preferably have an acid number between about 23 and 44. These maleated amorphous polypropylenes are well known in the art and are prepared by graft polymerization as illustrated in U.S. Pat. No. 4,567,223 the disclosure of which is incorporated in its entirety herein by reference. The maleated amorphous polypropylenes more preferably have an acid number between about 20 and 23.

The composition according to the present invention preferably contains about 25 to 75 wt. % maleated amorphous polypropylene based on a total of polymer and elastomer. More preferably the composition contains between about 40 and 60 wt. % maleated amorphous polypropylene with about 50 wt. % maleated amorphous polypropylene being most preferred.

The composition according to the present invention, when used as a hot-melt adhesive formulation, preferably contains about 20 to 70 wt. % tackifier more preferably about 40 to 60 wt. %.

The composition of the present invention, when used as a caulk or sealant, preferably contains about 5 to 30 wt. % tackifier, and about 20 to 60 wt. % filler. More preferably the caulk or sealant composition contains about 10 to 20 wt. % tackifier and about 20 to 30 wt. % filler.

The tackifier used in the composition of the present invention is preferably selected from at least one of the groups consisting of hydrocarbon resins, synthetic polyterpenes, and rosin esters The tackifier preferably has a ring and ball softening point of about 95° to 135° C. Suitable resins and rosin esters are the terpene polymers having the suitable ring and ball softening point such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing a mixture of sulphate terpene, and at least 20% of at least one other terpene selected from the group consisting of pinene, limonene, or dipentene.

The more preferred tackifying resins are selected from hydrocarbon resins such as disclosed in U.S. Pat. No. 3,850,858 the disclosure of which is incorporated in its entirety herein by reference. These hydrocarbon resins preferably have a ring and ball softening point of about 100° to 130° C., an acid number of about 0 to 2 an acid value of less than about 1 and an iodine value of 75 to 100. These hydrocarbon tackifying resins can be prepared by the polymerization of monomers consisting primarily of olefins and diolefins and include, for example, the residual by-product monomers resulting from the manufacture of isoprene.

Fillers suitable for use in the present invention are, for example, finely divided fume silica, calcium carbonate, titanium dioxide, zinc dioxide, graphite, clay, talc, other metal oxides, and the like. Such fillers have a particle size not much greater than 20 microns preferably between about 5 and 10 microns and are preferably selected from calcium carbonate, titanium dioxide, and zinc dioxide.

The elastomer used in the elastomeric composition of the present invention is selected from butyl elastomers, at least partially crosslinked butyl elastomers, styrene, ethylene/butadiene/styrene block copolymers and mixtures thereof. These elastomers are generally known and are prepared commercially. Elastomers are more preferably selected from butyl elastomers at least partially crosslinked with divinyl benzene and butyl elastomers having unsaturated isoprene and isobutylene units. Suitable elastomers for example include KALAR 5214 a partially crosslinked butyl elastomer from Hardman Chemical Company and EXXON 268 a crosslinked butyl elastomer from Exxon Chemical Company.

Antioxidants can also be added to the adhesive composition of the present invention. Examples of effective antioxidants include, tris(di-t-butyl-p-hydroxybenzyl)-trimethylbenzene (available as Ionox 330 from Shell Chemical), alkylated bisphenol (available as Naugawhite from Uniroyal), zinc dibutyl dithiocarbamate (available as Butyl Zimate from R. T. Vanderbilt), and 4,4'-methylene bis(2,6-di-tert-butylphenol) (Ethyl 702), tetrakis[methylene(3,5-di-tert-butyl-4-hydroxyhydroinnamate)methane] (available as Irganox 1010 from Ciba Geigy), lauryl stearyl thiodipropiuonate (Plastanox 1212), and dilauryl 3,3'-thiodipropionate (Plastanox LTDP), and 2,6-di-tert-butyl-p-cresol (BHT).

The following examples are presented to further illustrate the present invention and are not intended to limit the reasonable scope thereof.

EXAMPLES

The following test procedures were used to determine properties.

Test specimens for determining elevated temperature and elevated temperature shear strengths were prepared and tested according to shear strength - ASTM D-1002.

Structural strength was determined from peel and tensile strength according to peel strength - ASTM D-1876 and tensile strength - ASTM D-638.

Acid number, expressed as milligrams of potassium hydroxide required to neutralize one gram of sample was determined in hot toluene using phenolthaline as indicator.

The examples illustrate the improvements in structure strength of a sealant by substituting a polymer according to the present invention for a portion of elastomer. Blends were made using a Sigma Blade Mixer at a temperature of 350° F. and compounding for a minimum of 2 hours. The only variables were the amount of elastomer and polymer. The composition and results of the improvement in tensile strength, structured strength, or peel adhesion are listed in the following tables.

EXAMPLE 1

The following example illustrates the preparation of a control elastomeric composition.

TABLE 1

| Testing Formulation | |
| --- | --- |
| Cross-linked butyl elastomer | 35 Percent |
| Calcium Carbonate | 30 Percent |
| Stearic Acid | .5 Percent |
| Irganox 1010 Antioxidant | .5 Percent |
| Polybutene H-100 | 34 Percent |

This formulation was compounded in a double arm jacketed mixer at 350° F. for two hours. The formulation was then tested by peel adhesion, using a standard peel adhesion testing method commonly incorporated in the trade. The peel adhesions were prepared by applying a 20 mil film of the above sealant to an aluminum, cold roll steel, galvanized and glass substrates. The specimens were tested after standing for 24-hours at room temperature and then after water immersion for 21-days at room temperature. The samples were tested on an Instron tester typically used in the sealant trade. This above formulation was then incorporated as a control in further testing and is indicated by A in Table 3 below.

EXAMPLE 2

The formulations below were prepared and tested as above in Example 1 with the variations listed in the table. Table 2 below illustrates that the addition of an amorphous propylene-butene copolymer to an elastomeric composition, particularly the maleated copolymer, does not lower the properties and, in fact, enhances the peel strength of this sealant or caulk formulation, particularly the higher acid number maleated propylene-butene copolymer All peel adhesion failures were cohesive.

TABLE 2

| Testing Formulation: | Percent/Weight | | | |
|---|---|---|---|---|
| | A | B | C | D |
| Cross-linked butyl elastomer | 35.0 | 17.5 | 17.5 | 17.5 |
| Calcium Carbonate | 30.0 | 30.0 | 30.0 | 30.0 |
| Stearic Acid | .5 | .5 | .5 | .5 |
| Irganox 1010 antioxidant | .5 | .5 | .5 | .5 |
| Polybutene H-100 | 34.0 | 34.0 | 34.0 | 34.0 |
| Amorphous P/B* | | 17.5 | — | |
| Maleated Amorphous P/B* (Acid number 40) | — | | 17.5 | |
| Maleated Amorphous P/B* (Acid number of 21) | — | — | | 17.5 |

*P/B = propylene-butene copolymer containing 30% propylene and 70% butene

| Substrates | Test Results | | | |
|---|---|---|---|---|
| | A | B | C | D |
| Initial Peel Adhesion (PLi) pounds per linear inch | | | | |
| Aluminum | 12 | 5 | 32 | 21 |
| Cold Roll Steel | | | 30 | 20 |
| Galvanized | 9 | 15 | 33 | 20 |
| Glass | 12 | 13 | 37 | 26 |
| Peel Adhesion After 21 Day Water Immersion (PLi) | | | | |
| Aluminum | 13 | 14 | 41 | 23 |
| Cold Roll Steel | | | 39 | 31 |
| Galvanized | 9 | 22 | 52 | 25 |
| Glass | 13 | 15 | 40 | 29 |

EXAMPLE 3

The formulations below were prepared and tested as above in Example 1 with the variations listed in the table. Table 3 below illustrates that the addition of a maleated terpolymer to an elastomeric composition does not lower the properties and in fact enhances the peel strength of the elastomeric composition over an unextended standard. All peel adhesion failures were cohesive.

TABLE 3

| Testing Formulation | Percent/Weight | | | |
|---|---|---|---|---|
| | STD | | | |
| Cross-linked butyl elastomer | 35.0 | 17.5 | 17.5 | 17.5 |
| Calcium carbonate | 30.0 | 30.0 | 30.0 | 30.0 |
| Stearic Acid | .5 | .5 | .5 | .5 |
| Irganox 1010 antioxidant | .5 | .5 | .5 | .5 |
| Polybutene H-100 | 34.0 | 34.0 | 34.0 | 34.0 |
| Maleated Amorphous P/E/B* (Acid #22) | | 17.5 | | |
| Maleated Amorphous P/E/B** (Acid #20) | | | 17.5 | |
| Maleated Amorphous P/E/B** (Acid #39) | | | | 17.5 |

*P/E/B = Propylene-ethylene-butene terpolymer containing 53% propylene, 2% ethylene, and 45% butene
*P/E/B = Propylene-ethylene-butene terpolymer containing 69% propylene, 6% ethylene, and 25% butene.

| | Initial Peel Adhesion (PLi) Average of 5 Tests | | | |
|---|---|---|---|---|
| | STD | | | |
| Aluminum | 12 | 22 | 27 | 29 |
| Cold Roll Steel | | 22 | 23 | 24 |
| Galvanized | 9 | 23 | 27 | 28 |
| Glass | 12 | 28 | 29 | 26 |
| Peel Adhesion After 21 Day Water Immersion (PLi) Average of 5 Tests | | | | |
| Aluminum | 13 | 29 | 32 | 34 |
| Cold Roll Steel | | 37 | 34 | 30 |
| Galvanized | 9 | 52 | 31 | 37 |
| Glass | 13 | 37 | 39 | 38 |

EXAMPLE 4

The formulations below were prepared and tested as above in Example 1 with the variations listed in the table. Table 4 below illustrates that the addition of maleated propylene-ethylene copolymer, particularly the higher acid number of 43, does not lower the properties and in fact enhances the peel adhesion of the elastomeric composition, both initial and after 21-day water immersion over an unextended standard and non-maleated amorphous polyolefin propylene-ethylene copolymer. All peel adhesion failures were cohesive.

TABLE 4

| Testing Formulation: | Percent/Weight | | | |
|---|---|---|---|---|
| | STD | | | |
| Cross-linked butyl elastomer | 35.0 | 17.5 | 17.5 | 17.5 |
| Calcium carbonate | 30.0 | 30.0 | 30.0 | 30.0 |
| Stearic acid | .5 | .5 | .5 | .5 |
| Irganox 1010 Antioxidant | .5 | .5 | .5 | .5 |
| Polybutene H-100 | 34.0 | 34.0 | 34.0 | 34.0 |
| Amorphous P/E* | | 17.5 | | |
| Maleated Amorphous P/E* (Acid #43) | | | 17.5 | |
| Maleated Amorphous P/E* (Acid #23) | | | | 17.5 |

*P/E = Propylene-ethylene copolymer containing 87% propylene and 13% ethylene.

| | Initial Peel Adhesion (PLi) Average of 5 Tests | | | |
|---|---|---|---|---|
| | STD | | | |
| Aluminum | 12 | 14 | 15 | 12 |
| Cold Roll Steel | | | 21 | 7 |
| Galvanized | 9 | 17 | 18 | 14 |
| Glass | 12 | 16 | 21 | 11 |
| Peel Adhesion After 21 Day Water Immersion (PLi) Average of 5 Tests | | | | |
| Aluminum | 12 | 8.4 | 20 | 20 |
| Cold Roll Steel | | | 33 | 18 |
| Galvanized | 9 | 18 | 20 | 18 |
| Glass | 12 | 14 | 12 | 17 |

EXAMPLE 5

The formulations below were prepared and tested as above in Example 1 with the variations listed in the table. Table 5 below illustrates that the addition of maleated propylene homopolymer to an elastomeric composition does not lower the properties and in fact enhances the initial and water immersion peel strengths of the elastomeric composition, over a nonmaleated and an unextended standard. All peel adhesion failures were cohesive.

TABLE 5

| Testing Formulation | Percent/Weight | | | |
|---|---|---|---|---|
| | STD | | | |
| Cross-linked butyl elastomer | 35.0 | 17.5 | 17.5 | 17.5 |
| Calcium carbonate | 30.0 | 30.0 | 30.0 | 30.0 |
| Stearic acid | .5 | .5 | .5 | .5 |
| Irganox 1010 antioxidant | .5 | .5 | .5 | .5 |
| Polybutene H-100 | 34.0 | 34.0 | 34.0 | 34.0 |
| Amorphous PP* | | 17.5 | | |

TABLE 5-continued

| Testing Formulation | Percent/Weight | | |
|---|---|---|---|
| | STD | | |
| Maleated Amorphous PP* (Acid #42) | | 17.5 | |
| Maleated Amorphous PP* (Acid #23) | | | 17.5 |

*PP = Polypropylene homopolymer

| | Initial Peel Adhesion; (PLi) Average of 5 Tests | | | | |
|---|---|---|---|---|---|
| | STD | | | | |
| Aluminum | 12 | 17 | | 15 | 23 |
| Cold Roll Steel | | | | 22 | 26 |
| Galvanized | 9 | 11 | | 17 | 19 |
| Glass | 12 | 11 | | 22 | 23 |
| | Peel Adhesion After 21 Day Water Immersion (PLi) Average 5 Tests | | | | |
| | STD | | | | |
| Aluminum | 13 | 18 | | 21 | 33 |
| Cold Roll Steel | | | | 26 | 42 |
| Galvanized | 9 | 2 | | 25 | 28 |
| Glass | 12 | 11 | | 16 | 19 |

EXAMPLE 6

The formulations below were prepared and tested as above in Example 1 with the variations listed in the table. Table 6 below illustrates that the addition of maleated amorphous propylene-hexene copolymer to an elastomeric composition does not lower the properties and in fact enhances the peel strength of the elastomeric composition, both initial and after 21 day water immersion, over an unextended standard and a nonmaleated amorphous propylene-hexene copolymer containing sealant formulation. All peel adhesion failures were cohesive.

TABLE 6

| Testing Formulation: | Percent/Weight | | | | | |
|---|---|---|---|---|---|---|
| | STD | | | | | |
| Cross-linked butyl elastomer | 35.0 | 17.5 | 17.5 | 17.5 | 17.5 | 17.5 |
| Calcium carbonate | 30.0 | 30.0 | 30.0 | 30.0 | 30.0 | 30.0 |
| Stearic Acid | .5 | .5 | .5 | .5 | .5 | .5 |
| Irganox 1010 | .5 | .5 | .5 | .5 | .5 | .5 |
| Polybutene H-100 | 34.0 | 34.0 | 34.0 | 34.0 | 34.0 | 34.0 |
| Amorphous P/H* | | 17.5 | | | | |
| Maleated Amorphous P/H* (Acid #44) | | | 17.5 | | | |
| Maleated Amorphous P/H* (Acid #22) | | | | 17.5 | | |
| Maleated Amorphous P/H* (Acid #40) | | | | | 17.5 | |
| Maleated Amorphous P/H* (Acid #20) | | | | | | 17.5 |

*P/H = Propylene-hexene copolymer

| | Initial Peel Adhesion (PLi) Average of 5 Tests | | | | | |
|---|---|---|---|---|---|---|
| | STD | | | | | |
| Aluminum | 12 | 9 | 21 | 24 | 16 | 11 |
| Cold Roll Steel | | 25 | 21 | 16 | 21 | |
| Galvanized | 9 | 10 | 29 | 21 | 20 | 22 |
| Glass | 12 | 13 | 21 | 23 | 22 | 23 |
| | Peel Adhesion After 21 Day Water Immersion (PLi) Average of 5 Tests | | | | | |
| | STD | | | | | |
| Aluminum | 13 | 3 | 18 | 25 | 32 | 24 |
| Cold Roll Steel | | 31 | 29 | 36 | 32 | |
| Galvanized | 9 | 3 | 28 | 18 | 29 | 26 |
| Glass | 13 | 13 | | 27 | 32 | 19 |

The invention has been described in detail with particular reference to preferred embodiments thereof, but it will be understood that variations and modifications can be effected within the spirit and scope of the invention.

We claim:

1. A composition comprising:
   (a) about 10 to 90 wt. %, based on (a) plus (b), of a maleated amorphous propylene terpolymer containing at least 20 wt. % propylene about 40 to 70 wt. % butene or hexene and up to 20 wt. % ethylene;
   (b) about 10 to 90 wt. %, based on (a) plus (b), of an elastomer selected from butyl elastomers and at least partially crosslinked butyl elastomers, styrene ethylene butadiene styrene block copolymers, and mixtures thereof;
   (c) about 0 to 70 wt. %, based on the total weight, of a tackifier, and;
   (d) about 0 to 80 wt. %, based on the total weight, of a filler.

2. A composition comprising:
   (a) about 10 to 90 wt. %, based on (a) plus (b), of a maleated amorphous propylene/butene/hexene terpolymer containing at least 20 wt. % propylene;
   (b) about 10 to 90 wt. %, based on (a) plus (b), of an elastomer selected from butyl elastomers and at least partially crosslinked butyl elastomers, crosslinked butyl elastomers, styrene ethylene butadiene styrene block copolymers, and mixtures thereof;
   (c) about 0 to 70 wt. %, based on the total weight, of a tackifier, and;
   (d) about 0 to 80 wt/ %, based on the total weight, of a filler.

3. The composition according to claim 1 wherein said terpolymer contains a mixture of butene and hexene.

4. The composition according to claim 1 wherein (b) is a crosslinked butyl elastomer.

5. The composition according to claim 2 wherein (b) is a crosslinked butyl elastomer.

* * * * *